US007620817B2

(12) United States Patent
Friedli et al.

(10) Patent No.: US 7,620,817 B2
(45) Date of Patent: Nov. 17, 2009

(54) SYSTEM FOR SECURITY CHECKING OR TRANSPORT OF PERSONS BY AN ELEVATOR INSTALLATION AND A METHOD FOR OPERATING THIS SYSTEM

(75) Inventors: Paul Friedli, Remetschwil (CH); Andreas Gaussmann, Hergiswil (CH)

(73) Assignee: Inventio AG, Hergiswil NW (CH)

( * ) Notice: Subject to any disclaimer, the term of this patent is extended or adjusted under 35 U.S.C. 154(b) by 656 days.

(21) Appl. No.: 10/829,489

(22) Filed: Apr. 22, 2004

(65) Prior Publication Data

US 2005/0138385 A1 Jun. 23, 2005

(30) Foreign Application Priority Data

May 5, 2003 (EP) ................................ 03405313

(51) Int. Cl.
*G06F 21/00* (2006.01)

(52) U.S. Cl. ............................ 713/182; 726/2; 116/64

(58) Field of Classification Search ................ 340/500, 340/10.31, 5.21, 5.64; 342/30, 42; 713/182, 713/185, 186; 380/277; 187/384, 396, 395; 704/246, 275; 455/422.1, 41.2, 411; 324/658, 324/661; 235/385, 380, 382, 436; 726/2; 116/64
See application file for complete search history.

(56) References Cited

U.S. PATENT DOCUMENTS 4,590,604 A 5/1986 Feilchenfeld
5,679,933 A * 10/1997 Weber et al. ................ 187/395
5,689,094 A 11/1997 Friedli et al.
6,354,120 B1 * 3/2002 Tan et al. ....................... 70/252
6,354,405 B1 * 3/2002 Svensson-Hilford et al. ........................ 187/384
6,397,976 B1 6/2002 Hale et al.
6,615,175 B1 * 9/2003 Gazdzinski ................. 704/275
6,747,546 B1 * 6/2004 Hikita et al. ............. 340/10.31
7,016,311 B2 * 3/2006 Tiernay et al. .............. 370/252

FOREIGN PATENT DOCUMENTS

| | | |
|---|---|---|
| CN | 1407945 A | 4/2003 |
| DE | 196 08 382 | 9/1997 |
| EP | 0 699 617 | 3/1996 |
| EP | 0 832 839 | 4/1998 |
| EP | 0832839 A1 | 4/1998 |
| EP | 1 314 676 | 5/2003 |
| WO | WO 00/60374 | 10/2000 |
| WO | WO 00/60374 A1 | 10/2000 |
| WO | WO 01/07353 | 2/2001 |
| WO | WO 01/25128 | 4/2001 |

* cited by examiner

*Primary Examiner*—Thanhnga B Truong
(74) *Attorney, Agent, or Firm*—Fraser Clemens Martin & Miller LLC; William J. Clemens

(57) ABSTRACT

A system for security checking or transport of persons by an elevator installation and to a method of operating this system wherein in a person is authenticated by at least one authentication signal. At least one mobile authentication device carried by the person detects an authentication signal of the person and checks it with at least one person reference. In the case of correspondence of the authentication signal and the person reference, at least one identification code is provided. The identification code is detected by a stationary recognition device and assigned to a predefined travel destination or to an input travel destination input at the recognition device by the person.

19 Claims, 1 Drawing Sheet

SYSTEM FOR SECURITY CHECKING OR TRANSPORT OF PERSONS BY AN ELEVATOR INSTALLATION AND A METHOD FOR OPERATING THIS SYSTEM

BACKGROUND OF THE INVENTION

The present invention relates to a system for safety checking or transport of persons by an elevator installation and to a method for operating this system.

Systems for security checking of persons are known. For example, such systems control the entrance/exit of persons to/from buildings, floors, rooms, etc.

Intelligent systems for transporting persons enable transport, which is controlled by identification, of persons in transport means. The specification of European patent EP 0 699 617 shows a device for controlling an elevator installation in which the elevator installation is controlled by a person through an identification code. In that case, a recognition device recognizes the identification code and passes it on as a control signal to a processing unit. This unit reads the control signal and allocates thereto a predefined, desired travel destination. The bearer of the identification code is thus identified and a travel destination is assigned to him or her. The processing unit transmits a corresponding control signal to the elevator installation, which then automatically conveys the person to the travel destination.

It has now proved to be a disadvantage that unauthorized persons can use the identification code in order to gain access to buildings, floors, rooms, etc., and in order to be able to be transported by the elevator installation.

According to the PCT specification WO 01/25128 a person carries a mobile input device which undertakes authentication by speech recognition and checks whether the person is who he or she purports to be. The person also inputs his or her travel destination by way of the mobile input device, which passes on the travel destination as a control signal to a processing unit, which then communicates a corresponding control signal to the elevator installation which automatically transports the person to the travel destination. The relative awkwardness of this input device, which also necessitates an associated electrical current supply, is disadvantageous.

SUMMARY OF THE INVENTION

It is the object of the present invention to provide a system for security checking or transporting persons by an elevator installation and a method of operating this system, wherein the reliability of the identification is increased in simple mode and manner with, at the same time, a more user-friendly possibility of input of a travel destination.

The present invention fulfils the object in that a person, who is to be transported by an elevator installation, is authenticated by detection of at least one authentication signal by at least one mobile authentication device. For this purpose an authentication signal is detected from the person and checked with at least one person reference. If the authentication signal and person reference correspond, at least one identification code is provided. The identification code is detected by a stationary recognition device. A predefined travel destination or a travel destination input at the recognition device by the person is assigned to the identification code.

Advantageously, the mobile authentication device is similar in size and weight to a credit card and the person carries it with them and can use it at any time simply and quickly. For example, a person takes an authentication device, which is similar to a card, with a fingerprint sensor near the elevator installation in his or her hand and an authentication of the person and a destination call take place already. In addition, the use of this authentication device by a single person is very hygienic. Advantageously, the mobile authentication device does not require an own energy source, but is supplied with electrical current by at least one external energy source, which makes this authentication device simple to use and maintain and economic to provide.

A biometric signal is used as the authentication signal. Advantageously, a fingerprint, or a hand geometry, or a facial profile, or an iris pattern, or a retinal scan, or a thermogram, or a smell, or a voice, or a signature, or pressing a button is used as authentication signal.

Advantageously, the stationary recognition device comprises at least one input means for input of the travel destination, which can be a known and proven control and display panel with buttons or a touch screen. This has the advantage that the mobile authentication device does not have to contain such input means and can be constructed to be correspondingly small and simple.

Advantageously, the identification code is checked with a user reference in order to establish whether the person is also a registered user of the elevator installation. In this identification it is checked whether at least one user reference exists for the detected identification code.

Advantageously, in the case of successful association of identification code and user reference at least one control signal is transmitted to the elevator installation in order to transport the person to the travel destination. In the case of an unsuccessful authentication or in the case of an unsuccessful identification, at least one alarm signal is transmitted in order to lock the person in the elevator car or to deny the person access to the travel destination.

Advantageously, in addition to authentication and identification there is carried out an access control in which it is established whether the person also has authorized access to the travel destination. Advantageously, an access authorization to the travel destination is checked with at least one access authorization. The travel destination of the person is advantageously compared with a list of travel destinations of the access authorization. In the case of presence of access authorization to the travel destination, at least one control signal is communicated to the elevator installation in order to transport the person to the travel destination. In the case of unsuccessful access check, at least one alarm signal is communicated in order to lock the person in the elevator car or to deny the person access to the travel destination.

The present invention is suitable for exclusive, as also for alternative or supplementary, identification of persons in elevator installations. For example, for this purpose mobile authentication devices carried by persons are supplemented by further stationary authentication devices near the elevator installation. Such a need exists, for example, in zones with high security requirements, such as banks, military zones of protection, etc.

DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

Figure 1:
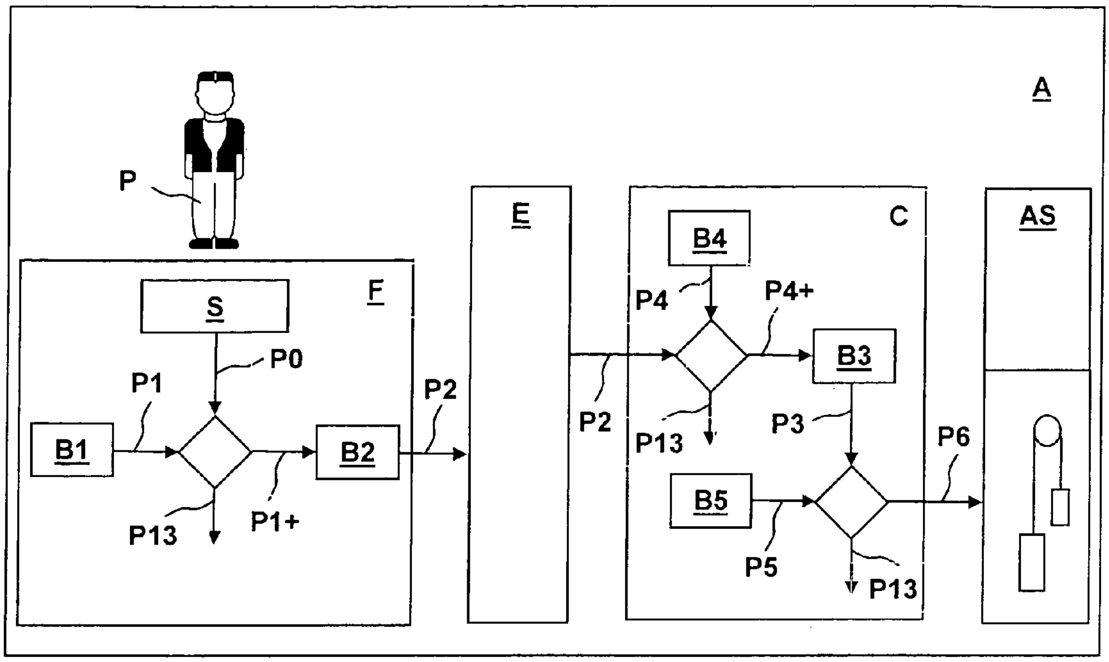
FIG. 1 is a schematic part block and part flow diagram of a first embodiment of an apparatus and a method in accordance with the present invention.
Figure 2:
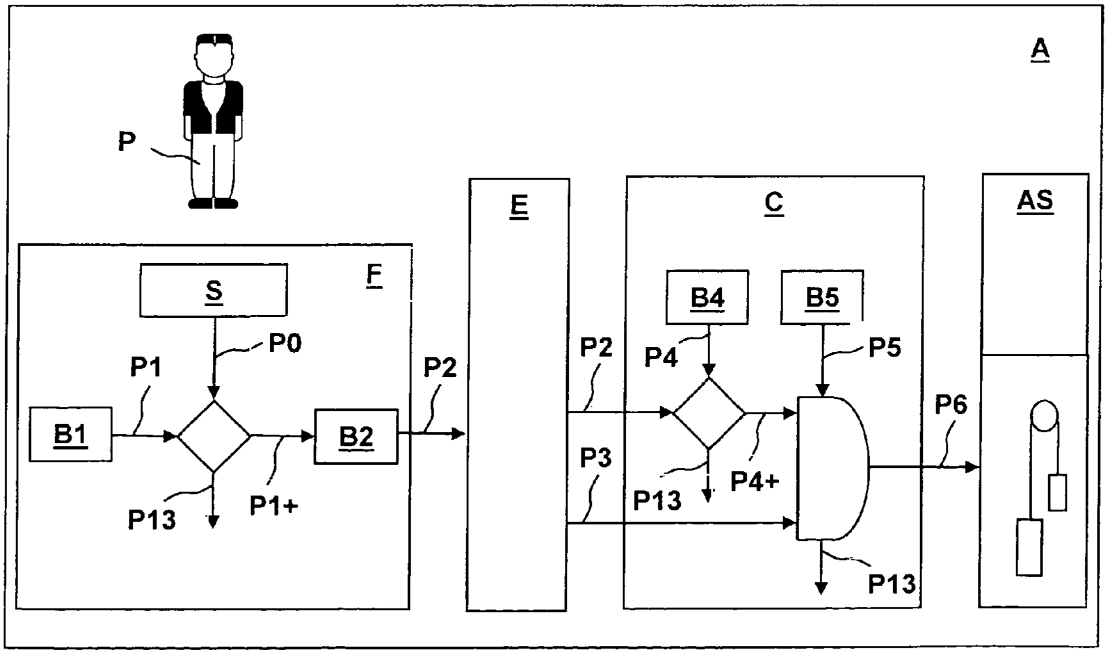
FIG. 2 is a schematic part block and part flow diagram of a second embodiment of an apparatus and a method in accordance with the present invention.

In these basic illustrations, FIGS. 1 and 2, a person P is transported by an elevator installation A. Authenticatable goods can also be transported instead of a person. The elevator installation A can be any elevator installation, which is installed inside or outside a building, with an elevator car, a drive and an elevator control AS. A drive with an elevator car fastened to a conveying cable and a counterweight fastened to the conveying cable are schematically illustrated. All known and proven elevator installations can be used. For example, hydraulic elevator installations or also such in which the drive is fastened directly to the car, and naturally also escalators, can be used.

An authentication device F detects at least one authentication signal P0 of the person P, checks the authentication signal P0 and provides an identification code P2. The following biometric methods of authentications are preferably used:

Fingerprint—A fingerprint of the person P is detected, for example scanned. Preferably, the person P places a finger on a surface of the authentication device F, where a fingerprint is photographed by a camera as a grey tone image. The grey tones are preferably converted to binary or the line widths reduced. Details are marked.

Hand geometry—Dimensions of a hand of the person P are detected. The person P preferably places at least a part of his or her hand on a surface of the authentication device F, where a three-dimensional silhouette of the hand is photographed by a camera. Protrusions preferably assist in positioning the hand.

Facial profile—A facial profile of the person P can be detected as a three-dimensional model or as a two-dimensional pattern or as an infrared image as well as a combination of these methods. In addition, black-and-white images or color images can be detected. The detection angle can vary, thus profile images or frontal images or general perspectives can be detected. In terms of time, a static image or an image sequence can be detected. The authentication device F photographs at least a part of the facial profile of the person P by a camera.

Iris profile—A texture of the iris of the person P is detected. Preferably, the person P stands at a spacing of a few decimeters distance in front of the authentication device F and looks into a camera, which camera photographs the iris texture. This photograph is digitized to form an iris code. The iris is preferably divided into annular regions and characteristic features are marked.

Retinal scan—A structure of the veins of the retina of the person P is detected, for example scanned. The person P preferably stands at a few decimeters distance in front of the authentication device F and looks into a camera, which camera photographs the structure of the veins of the retina. For this purpose the eye is preferably irradiated with infrared light. The photoreceptive structures of the eye reflect the infrared light, which reflection is photographed. This photograph is digitized to form a retina code and characteristic features are marked.

Thermogram—Thermal radiation of the person P is detected. Preferably, a thermal camera of the authentication device F records a facial or whole body thermogram.

Smell—A smell of the person P is detected by a smell sensor of the authentication device F.

Voice—Vocal pitch or voice break or accents or speech impediments of the person P is or is or are detected. For that purpose the person P speaks into a microphone of the authentication device F and one or more phrases are recorded.

Signature—A signature of the person P is detected, for example scanned. The person P writes a signature on a surface of the authentication device F, which signature is photographed by a camera. Preferably, strokes or dynamics or sounds of writing of the signature are marked or determined.

Pressing a button—The mode and manner how buttons of a keyboard are pressed by the person P are detected. Preferably, the authentication device F ascertains, by sensors, the force or dynamics of the pressing of the button.

Advantageously the authentication device F comprises at least one sensor S for detecting the authentication signal P0, at least one data store B1 for filing a person reference P1, at least one data store for storing a recognition software, as well as at least one computer unit for execution of the recognition software. The sensor S is, for example, a camera for detecting a fingerprint, or a hand geometry, or a facial profile, or an iris profile, or a retinal scan, or a signature. The sensor S is, for example, a thermal camera for detecting a thermogram. The sensor S is, for example, a smell sensor for detecting a smell. The sensor S is, for example, a microphone for detecting a voice. The sensor S is, for example, a button for detecting the pressing of the button. At least one of the authentication signal P0 is advantageously digitized and filed in at least one preceding method step as the person reference P1. With the recognition software there takes place an authentication by comparison of the detected authentication signal P0 with the filed person reference P1. For example, specific characteristic features of the authentication signal P0 and the person reference P1 are compared with one another. This is carried out by a standard software which is available to an expert in the field of elevators.

The authentication signal P0 is assignable more or less uniquely to the person P or the acceptance on the part of the user to be subjected to an authentication is high to a greater or lesser extent. Thus, the iris pattern can be assigned quite uniquely to a person, but acceptance of an iris pattern authentication is low.

In a preferred form of embodiment at least two authentication signals P0 are detected from the person P and checked. Especially in high-security systems—thus in security-conscientious buildings such as banks, military facilities, etc.—several authentication signals P0 are detected from the person P and evaluated. For example, a fingerprint and an iris pattern of the person P are detected. The uniqueness of the authentication is thereby strongly increased.

Advantageously the authentication takes place before entering the elevator car. Advantageously the authentication device F is used in the immediate vicinity of the elevator installation A. Advantageously the authentication device F and a recognition device E of the elevator installation A comprise a transmitting and receiving unit. For example, the authentication device F comprises a transponder which transmits or receives codes by radio signals. For this purpose, typical radio frequencies are 900 MHz to 6 GHz. For example, the authentication device F automatically receives at least one recognition signal from the recognition device E as soon as the receiving unit of the authentication device F is disposed at a spacing of a few decimeters from the transmitting unit of the recognition device E. With knowledge of the present invention, the expert can obviously also use other transmitting and receiving units and other radio frequencies.

The authentication device F is mobile, i.e. the person P carries it in size and weight similarly to a credit card and can use it at any time simply and quickly. The use of the authentication device F by a single person is very hygienic. In a first advantageous form of embodiment the authentication device F does not need an energy source, but uses an external energy source for an electrical current supply. For example, the authentication device F is supplied with current by way of an electromagnetic field. This can take place by radio waves via the recognition device E as soon as the authentication device F is disposed at a spacing of a few decimeters from the recognition device E. In a further advantageous form of embodiment the authentication device F is autonomous in terms of energy, i.e. it has an own electrical current supply like a battery, an accumulator, a fuel cell, etc.

Advantageously, the authentication device F or the recognition device E comprises at least one output means for the output of an acoustic or optical or mechanical demand signal. For example, an acoustic demand signal in the form of a tone sequence is used, for example an optical demand signal in the form of a light is used, or for example a mechanical demand signal in the form of a vibration is used. Obviously, demand signals can also be combined with one another and varied.

Advantageously the person P has a predetermined time window in order to undertake the authentication as well as the identification. For example, the authentication by the sensor S and the recognition software of the authentication device F lasts exactly 15 seconds. Through setting a time window of 60 seconds the person P has sufficient time to also actually undertake this authentication, i.e. to bring the authentication device F into position, to detect an authentication signal, to compare the detected authentication signal with the filed person reference P1 and to transmit the result to the recognition device E. Obviously, the authentication of the person can also be less than 15 seconds depending on the respective sensor which is used, for example less than 5 seconds, for example less than 1 second.

The result of the authentication is either positive or negative. In the case of positive authentication, i.e. on correspondence of the authentication signal P0 and the person reference P1, the output software provides at least one positive authentication signal P1+. In the case of negative authentication, i.e. in the case of non-correspondence of the authentication signal P0 and the person reference P1, the output software provides at least one alarm signal P13. Advantageously, the identification code P2 is set up and filed in at least one preceding method step. For example, the identification code P2 is a numerical sequence or a numeral and letter sequence.

Basically, the identification code P2 filed in the authentication device F, or the alarm signal P13 of the authentication device F, or the authentication code P2 known to the person P is transmitted. For the first case, the authentication device F advantageously comprises at least one second data store B2 for filing the identification code P2, at least one data store for storing an output software as well as at least one computing unit for executing the output software. The output software checks the presence of the positive authentication signal P1+ and thereupon provides the filed identification code P2.

The transmission of the identification code P2 or of the alarm signal P13 to the recognition device E can take place in numerous ways:

Thus, it is possible that the authentication device F comprises a transmitting and receiving unit and communicates the identification code P2 filed in the authentication device F or the alarm signal P13 of the authentication device F by radio to the recognition device E.

For example, it is also possible that the person P is provided acoustically or optically or mechanically with the identification code P2 or the alarm signal P13 from the authentication device F with an output means and that the person P inputs the identification code P2 at the input means of the recognition device E.

Alternatively thereto it is possible that the person P receives, from the authentication device F or the recognition device E with an output means, an acoustic or optical demand signal for entry at the recognition device E of the identification code P2 known to the person P.

It is also possible that the person P receives, from the authentication device F or the recognition device E with an output means, an acoustic or optical demand signal for entry, by way of an input means of the authentication device F, of the identification code P2 known to the person P.

The possibilities of transmission can take place within the time window set by the recognition device E. However, it is also possible that the authentication device F transmits to the recognition device E by radio at least one transmission signal in order to inform the recognition device E about the imminent transmission or in order to set the recognition device E a time window for transmission of the identification code P2. Finally, it is possible that the authentication device F sends to the recognition device E the positive authentication signal P1+ or the alarm signal P13 as a transmission signal.

The transmission possibilities can b e combined and varied. For example, it is possible that the person inputs the identification code P2 by way of an input means of the authentication device F and the authentication device F transmits this identification code P2 by the transmitting and receiving unit via radio to the recognition device E. For example, it is possible to use acoustic and/or optical and/or mechanical input means of the authentication device F or the recognition device E. An acoustic input means is, for example, a microphone, an optical input means is, for example, a screen (touchscreen) and a mechanical input means is, for example, a keyboard.

With knowledge of the present invention the expert can realize numerous variations of the authentication device F, the recognition device E or a checking device C. For example, the authentication device F can be a component of an every-day portable apparatus for the person, such as a mobile telephone, a wristwatch, a portable computer (laptop, handheld, etc.), a camera, a photographic appliance, a portable radio, a music reproducing appliance (MP3 player, CD player, etc.), etc. In addition, the authentication device F can also be a component of several such appliances. Finally, the authentication device F can communicate by way of any radio networks with the recognition device E or also directly with the checking device C. The components of the authentication device F, the recognition device E and also the checking device C are commercially available and inexpensive.

The recognition device E is advantageously mounted in stationary position at an entrance to the elevator installation A. Advantageously, the recognition device E is a component of a control and display panel of the elevator installation A. Advantageously, the control and display panel is mounted near a floor door of the elevator installation A. In the form of embodiment of the invention according to FIG. 1, a travel destination P3 of the person P is predefined and filed in at least one third data store B3 of the checking device C. In the form of embodiment of the invention according to FIG. 2, the person P inputs the travel destination P3 by way of an input means of the recognition device E.

The identification code P2 and/or the travel destination P3 is or are transmitted by the recognition device E to the checking device C. Advantageously, the recognition device E and the checking device C communicate with one another by cable or radio. In that case, the recognition device E and the checking device C can form a single system. For example, a building comprises floors (not shown) and the elevator installation A with three elevators (only one is shown) arranged adjacent to one another. At least one of the recognition device E per floor is placed near the entrances (not shown) to the elevators. For example, each recognition device E is an insert which is pushable into a housing (not shown) of a control and display panel (not shown). For example, each control and display panel has at least one bus insert (not shown). These bus inserts are connected to a bus system (not shown), such as an LON bus. The recognition devices E communicate with one another by way of the bus system. For example, the checking device C is also an insert and pushed into one of the control and display panels. In addition, the checking device E communicates by way of the bus system with the recognition devices E.

The checking device C checks the association with at least one filed user reference P4 with the identification code P2 of the person P and checks the presence of at least one filed access authorization P5 to the travel destination P3 of the person P. For that purpose it comprises at least one fourth data store B4 for filing the at least one user reference P4, at least one fifth data store B5 for filing at least one access authorization P5, at least one data store for storing a checking software and at least one computer unit for executing the checking software. The checking device C can be a central remote server. The user reference P4 or the access authorization P5 is set up and filed in at least one preceding method step. For example, the user reference P4 is a numerical sequence or a numerical and letter sequence. For example, the access authorization P5 consists of a list with travel destinations for which the person P is authorized with respect to access.

The checking software checks whether the user reference P4 is filed for the detected identification code P2. For example, specific characteristic features of the identification code P2 and the user reference P4 are associated with one another. This is carried out by standard software which is available to an expert in the field of elevators.

The result of the identification is either positive or negative. In the case of positive identification, i.e. in the case of association of the identification code P2 and the user reference P4, the checking device C provides at least one positive identification signal P4+. In the case of negative identification, i.e. in the case of non-association of the identification code P2 and the user reference P4, the checking software provides at least one alarm signal P13.

The forms of embodiment, by way of example, of the present invention according to FIGS. 1 and 2 differ from one another insofar as in the first embodiment of the present invention according to FIG. 1, in the case of presence of the positive identification signal P4+, the predefined travel destination P3 is provided in the checking device C, whereas in the second embodiment of the present invention according to FIG. 2, the travel destination P3 is provided at the recognition device E. For example, the monitoring software checks the presence of the positive identification signal P4+ and thereupon provides the filed, predefined travel destination.

The checking software now checks whether the person P is authorized to be transported to the travel destination P3 or to gain access to the travel destination P3. For example, the checking software carries out a comparison whether the travel destination P3 is listed on the list of travel destinations of the access authorization P5. This is carried out by a standard software which is available to an expert in the field of elevators.

In the case of positive checking of the access authorization B5, the checking device C transmits the at least one control signal P6 to the elevator control AS of the elevator installation A in order to transport the person P to the travel destination P3. In the case of negative checking of the access authorization, the checking device C transmits the at least one alarm signal P13.

In the case of presence of the alarm signal P13, different procedures can be carried out. For example, none of the floor doors to the elevator installation A is opened for the person P. Independently thereof, a security service can be warned. It is also possible to give the person P access to an elevator car and then, for example, to close the elevator door and keep it locked until the security service is on site and undertakes a further checking of the access authorization B5 of the person P. For example, the elevator car is temporarily stopped or moved to a secure and discrete floor, for example a basement floor, where the person P is received by the security service. With knowledge of the present invention, the expert has numerous possibilities of variation. For example, the elevator control AS in the case of the presence of the alarm signal P13 can grant the person P access to an elevator car, close the elevator door, move the elevator car to a secure, discrete floor and then simulate an elevator breakdown so that the person P does not have any suspicion until the security service is on site for further checking of the access authorization B5 of the person P.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A method for security checking or transport of persons by an elevator installation comprising the steps of:

a) generating at least one authentication signal caused by a person interacting with a mobile authentication device and seeking to use the elevator installation;

b) detecting the at least one authentication signal with the mobile authentication device;

c) the mobile authentication device checking the at least one authentication signal with at least one person reference;

d) in the case of correspondence of the authentication signal and the person reference, the mobile authentication device providing at least one identification code;

e) detecting the at least one identification code with a stationary recognition device of the elevator installation; and f) assigning to the identification code one of a predefined travel destination and an input travel destination input at the recognition device by the person.

2. The method according to claim 1 including supplying the mobile authentication device with electrical power from at least one energy source external to the mobile authentication device.

3. The method according to claim 1 including selecting as the authentication signal a biometric signal being one of a fingerprint, a hand geometry, a facial profile, an iris pattern, a retinal scan, a thermogram, a smell, a voice, a signature and pressing of a button.

4. The method according to claim 1 including checking whether at least one user reference exists for the detected identification code.

5. The method according to claim 1 including comparing the input travel destination with at least one access authorization for generating one of a control signal and an alarm signal.

6. The method according to claim 1 including comparing the input travel destination with a list of travel destinations of an access authorization for generating one of a control signal and an alarm signal.

7. A system for security checking or transport of persons by an elevator installation comprising:

a mobile authentication device adapted to be carried by a person, said authentication device detecting an authentication signal caused by a person interacting with the mobile authentication device and checking whether said authentication signal corresponds with a person reference, said authentication device generating an identification code when said authentication signal corresponds to said person reference;

a stationary recognition device of the elevator installation for detecting said identification code; and a checking device connected to said recognition device for assigning to said identification code one of a predefined travel destination and an input travel destination input at said recognition device by the person to generate a control signal for the elevator installation.

8. The system according to claim 7 wherein said authentication device includes a sensor for generating said authentication signal in the presence of the person.

9. The system according to claim 8 wherein said sensor is a camera for detecting at least one of a fingerprint, a hand geometry, a facial profile, an iris profile, a retinal scan and a signature of the person.

10. The system according to claim 8 wherein said sensor is one of a thermal camera for detecting a thermogram of the person, a smell sensor for detecting a smell of the person, a microphone for detecting a voice of the person, and a button for detecting pressing of the button by the person.

11. The system according to claims 7 wherein said authentication device is adapted to be powered by an external energy source.

12. The system according to claim 7 wherein said authentication device includes a transmitting and receiving unit and said recognition device includes a transmitting and receiving unit for communicating said identification code.

13. The system according to claim 7 wherein said authentication device includes a data store for storing said person reference and compares said person reference with said authentication signal to generate said identification code.

14. The system according to claim 7 wherein said authentication device includes a data store for storing said identification code prior to detecting said authentication signal.

15. The system according to claim 7 wherein said recognition device includes input means for receiving said input travel destination from the person.

16. The system according to claim 7 wherein said checking device includes a data store for storing said predefined travel destination.

17. The system according to claim 7 wherein said checking device includes a data store for storing a user reference and compares said user reference with said identification code to generate said control signal.

18. The system according to claim 7 wherein said checking device includes a data store for storing an access authorization and compares said access authorization with one of said predefined travel destination and said input travel destination to generate said control signal.

19. A method for security checking or transport of persons by an elevator installation comprising the steps of:

a) selecting as an authentication signal a biometric signal being one of a fingerprint, a hand geometry, a facial profile, an iris pattern, a retinal scan, a thermogram, a smell, a voice, a signature and pressing of a button unique to a person seeking to use the elevator installation;

b) generating the at least one authentication signal caused by the person interacting with a mobile authentication device;

c) supplying the mobile authentication device with electrical power from at least one energy source external to the mobile authentication device;

d) detecting the at least one authentication signal with the mobile authentication device;

e) the mobile authentication device checking the at least one authentication signal with at least one person reference;

f) in the case of correspondence of the authentication signal and the person reference, the mobile authentication device providing at least one identification code;

g) detecting the at least one identification code with a stationary recognition device of the elevator installation;

h) checking whether at least one user reference exists for the detected at least one identification code;

i) assigning to the at least one identification code one of a predefined travel destination and an input travel destination input at the stationary recognition device by the person; and j) if the input travel definition is assigned, comparing the input travel destination with one of at least one access authorization and a list of travel destinations of an access authorization for generating one of a control signal and an alarm signal.

* * * * *